(12) United States Patent
Hoefelmayr

(10) Patent No.: US 9,918,449 B2
(45) Date of Patent: Mar. 20, 2018

(54) DEVICE FOR STIMULATING AN UDDER DURING MILKING

(71) Applicant: Tilman Hoefelmayr, Niederteufen (CH)

(72) Inventor: Tilman Hoefelmayr, Niederteufen (CH)

(73) Assignee: LACTOCORDER AG, Niederteufen (CH)

( * ) Notice: Subject to any disclaimer, the term of this patent is extended or adjusted under 35 U.S.C. 154(b) by 182 days.

(21) Appl. No.: 14/617,063

(22) Filed: Feb. 9, 2015

(65) Prior Publication Data

US 2015/0150211 A1 Jun. 4, 2015

Related U.S. Application Data

(62) Division of application No. 11/918,675, filed as application No. PCT/EP2006/003335 on Apr. 11, 2006.

(30) Foreign Application Priority Data

Apr. 20, 2005 (DE) .................. 10 2005 018 335

(51) Int. Cl.
*A01J 5/04* (2006.01)
*A01J 5/007* (2006.01)
(Continued)

(52) U.S. Cl.
CPC .............. *A01J 5/0075* (2013.01); *A01J 5/04* (2013.01); *A01J 5/10* (2013.01); *A01J 5/16* (2013.01); *Y10T 137/86389* (2015.04)

(58) Field of Classification Search
CPC .... A01J 5/0075; A01J 5/04; A01J 5/10; A01J 5/01; A01J 5/0175
(Continued)

(56) References Cited

U.S. PATENT DOCUMENTS 1,030,010 A * 6/1912 Newell .................... A01J 5/14
119/14.28
1,452,600 A 4/1923 Cyrus
(Continued)

FOREIGN PATENT DOCUMENTS

CA 1 248 903 1/1989
CN 1452716 A 10/2003
(Continued)

OTHER PUBLICATIONS

English translation of DE3638008 by Spillecke Volkmar.*
International Search Report dated Jun. 27, 2006 (4 pages).

*Primary Examiner* — Steven J Ganey
*Assistant Examiner* — Chee-Chong Lee
(74) *Attorney, Agent, or Firm* — Flynn, Thiel, Boutell & Tanis, P.C.

(57) ABSTRACT

The invention relates to a device for stimulating an udder during milking, made up of a housing with a first connection (350, 351) and a second connection (352, 353), which housing can be grasped by a hand. The first connection connects the housing to a pulsator and the second connection connects the housing to a teat cup. A throttle valve (305, 306) is interposed between the first connection and the second connection. A control device (309) is housed in the housing and is adapted to bring the throttle valve, after a defined duration, from a partially open to an open position.

9 Claims, 9 Drawing Sheets

(51) Int. Cl.
*A01J 5/10* (2006.01)
*A01J 5/16* (2006.01)

(58) Field of Classification Search
USPC .......................................................... 239/67
See application file for complete search history.

(56) References Cited

U.S. PATENT DOCUMENTS

| | | | |
|---|---|---|---|
| 2,361,970 A | 11/1944 | Schmitt | |
| 2,434,586 A * | 1/1948 | Reynolds | A01J 5/14 |
| | | | 119/14.28 |
| 2,628,589 A | 2/1953 | Reeve | |
| 3,236,207 A * | 2/1966 | Happel | A01J 5/041 |
| | | | 119/14.02 |
| 3,754,532 A | 8/1973 | Troberg et al. | |
| 3,783,837 A * | 1/1974 | Olander | A01J 5/007 |
| | | | 119/14.08 |
| 4,011,838 A * | 3/1977 | Nordegren | A01J 5/007 |
| | | | 119/14.08 |
| 4,034,714 A * | 7/1977 | Umbaugh | A01J 7/04 |
| | | | 119/14.18 |
| 4,190,021 A * | 2/1980 | Reisgies | A01J 5/0075 |
| | | | 119/14.08 |
| 4,304,262 A | 12/1981 | Icking | |
| 4,391,221 A | 7/1983 | Hoefelmayr et al. | |
| 4,524,720 A | 6/1985 | Brayer | |
| 4,643,132 A | 2/1987 | Icking et al. | |
| 6,500,143 B2 | 12/2002 | Suh | |
| 2003/0051668 A1 | 3/2003 | Watanabe | |

FOREIGN PATENT DOCUMENTS

| | | |
|---|---|---|
| DE | 27 46 310 | 4/1978 |
| DE | 35 03 245 C1 | 2/1986 |
| DE | 36 38 008 A1 | 10/1987 |
| GB | 1 592 408 | 7/1981 |
| RU | 2 263 446 C1 | 11/2005 |

* cited by examiner

DEVICE FOR STIMULATING AN UDDER DURING MILKING

CROSS-REFERENCE TO RELATED APPLICATIONS

This is a divisional of prior U.S. application Ser. No. 11/918,675, which claims the priority of German Application No. 10 2005 018 335.2, filed on Apr. 20, 2005, which was the national stage of International Application No. PCT/EP2006/003335, filed Apr. 11, 2006.

FIELD OF THE INVENTION

The present invention generally relates to automatic milking of production animals, particularly to devices with which an udder of a production animal can be stimulated before the milking.

DESCRIPTION OF RELATED ART

In modern agriculture, milking machines are used to milk production animals, particularly cows. These machines are designed to imitate the suckling process of a young animal and, in this way, to remove milk from the udder of the animal being milked. A milking machine according to the state of the art is described in the following, with reference to FIG. 1.

The milking machine comprises a teat cup cluster 100. The teat cup cluster 100 has teat cups 101, 102, 103, 104, corresponding to the number of teats on the animal to be milked. For this reason, four teat cups are provided in the teat cup clusters for milking cows. In each of the teat cups 101-104 a teat cup liner 105, 106, 107, 108 is inserted, such as, for example, the teat cup liner 105 in the teat cup 101. Each of the teat cup liners 105, 106, 107, 108 projects into the associated teat cup 101-104 and has, at a lower end, an opening to which a milk hose 109, 110, 111, 112 is connected.

The milk hoses 109-112 are connected to a claw 113. The claw 113 can have two chambers, with two of the milk hoses 109-112 being connected to each chamber. A milk line 119, 120 leads from each chamber to a collection container (not shown).

Furthermore, control hoses 115, 116, 117, 118 are connected to the teat cups 101-104. Each of the control hoses 115-118 connects a pulsation chamber, which comprises a volume between the inner wall of the associated teat cup 101-104 and the teat cup liner 105-108 inserted into this, to one of two control lines 121, 122. In particular, two teat cups can be connected to each of the control lines 121, 122. The control lines 121, 122 are connected to a pulsator.

During operation of the milking machine, each of the teat cups 101-104 is put on over a teat of the animal to be milked. The teats are then located in the interior of the teat cup liners 105-108. Subsequently, a vacuum is applied to the milk hoses 109, 110, 111 and 112. During the milking, the pulsator generates a periodically changing pressure in the pulsation chamber, whereby this changing pressure acts on the outer walls of the teat cup liners 105-108.

If the pressure at the outer walls of the teat cup liners 105-108 is equal to the pressure in the interior, the teat cup liners, due to their elastic tension, take on their normal spherical initial shape and exert essentially no pressure on the teats. This phase is called the suction phase, because the vacuum in the interior of the teat cup liners can overcome the resistance of the streak canal, and consequently can suction milk into the teat cup cluster. When the pressure at the outer wall of the teat cup liner 105-108 in the pulsation chamber is greater than the pressure in the interior of the teat cup liner 105, this liner is pressed inwards against the teat of the animal. In this way, the teat tip is pressed together so strongly that the vacuum in the interior of the teat cup liner does not suffice to overcome the resistance of the streak canal and consequently suction milk. This is called the relief phase. Due to the periodic pressure changes generated by the pulsator, the teats can be alternately pressed together and released. Because the teats are subjected to an essentially constant vacuum in the interior of the teat cup liner, blood and lymph accumulate in the teat tissue during the milking, whereby said blood and lymph should be conveyed back to the teat base by means of the periodic massaging movement of the teat cup liner. Furthermore, as a result of the teat cup liner movement, it is possible to imitate tactile stimuli that a suckled young animal exercises on the udder.

The pulsator can be designed in such a way that the periodic pressure changes in the control lines 121, 122 are out of phase with each other, namely in such a way that a maximum pressure always appears in one of the control lines 121, 122 at the same time that a minimum pressure appears in the other control line 121, 122. In this way, pressure can alternatingly be exerted on opposing teats, which evens out the milk removal and which is experienced by the milked animal as calming and pleasant. In contrast to the alternating cycle pulsation system described here, there are also simultaneous pulsation systems in which the control lines 121, 122 are combined into a single control line, whereby the periodic pressure changes act on all four teats simultaneously.

Effective milking that is appropriate to the species also includes pre-stimulation, in addition to the actual milking during which the largest portion of the milk is removed from the udder. During the pre-stimulation, the udder is placed into a state suitable for milk removal by means of mechanical stimuli. The teat tips are particularly sensitive to such stimuli.

The milk develops in small cavities in the gland tissue of the udder, which are called alveoli. Their walls consist of a thin layer of cells, the so-called alveoli (milk production cells), which are surrounded by a thick network of blood vessels, as well as fine muscular tissue. Substances in the animal's blood enter the milk production cells through the cell walls and are continually converted into milk there.

The tactile stimulus of the teats during pre-stimulation starts up two mechanisms. Firstly, this is the so-called tension release as a nervous reflex, which causes the teat to have increased blood circulation, so that the teat becomes erect and the streak canal becomes more elastic. Secondly, the tactile stimulus of the teats prompts the release of the hormone oxytocin in the animal's brain (hypothalamus). This hormone is transported through the bloodstream. In a cow, it takes between 40 and 60 seconds until it reaches the effector organ, the alveolus. There it causes the so-called milk ejection (milk letdown), the squeezing out of the milk formed and stored in the alveoli into the smaller and larger mammary ducts of the udder. From there, the milk, following gravity, can flow into the teat cistern, and so be available for removal of the milk.

To create full readiness for milking before the milking of the cow is started, the pre-stimulation should be carried out for approximately one minute. The release of the milk into the teat cistern, said release being prompted by the pre-stimulation, is needed to allow complete removal of the milk stored in the udder. Furthermore, it is important that the teats be fully erect before the removal of the milk, because otherwise it can easily happen that the teat cups slide upwards along the teats and strangulate the teat base. This constricts the inner connection duct between the teat cistern and the teat, as a result of which the removal of the milk is greatly hindered. If the teat cups slide up at the start of the milking, it is not only very uncomfortable for the animals, it can also cause injuries to the Fürstenberg rosette (annular fold) and inflammation of the udder.

Sufficient pre-stimulation has a positive effect on the animal's milk yield. FIG. 2 schematically shows the milk quantity produced by a cow during a lactation period. A first graph 201 shows the milk quantity, as a factor of the time elapsed since calving, that is produced by a cow on which sufficient pre-stimulation was carried out before the milking. The milk quantity produced by a cow on which sufficient pre-stimulation was not carried out before the milking is shown by a second graph 202.

During the first one hundred days after the birth of a calf, the quantity of milk produced increases, and then it slowly drops off again. If sufficient pre-stimulation is not carried out during the first one hundred days, this has only slight direct consequences on the cow's milk yield. Between day 100 and day 200, however, a cow on which sufficient pre-stimulation has not been carried out gives up to 15% less milk. Between day 200 and day 300, sufficient pre-stimulation can even make it possible to realise an increase in the milk yield of up to 30%. The extra yield of 15% or 30% can only be reached, however, if the cow is sufficiently pre-stimulated during the entire lactation period, meaning even during the first one hundred days. The quality of the milk can also be improved by means of sufficient pre-stimulation.

The pre-stimulation can be carried out by hand by lightly massaging the teats for at least one minute before milking. This is associated with considerable time expenditure, particularly on farms with larger numbers of livestock. Consequently, for industrial engineering reasons, in practice the milking machine is usually attached directly to the udder that has not been pre-stimulated, although many farmers are fundamentally aware of the considerable disadvantages of refraining from carrying out adequate pre-stimulation.

When the switched-on milking machine is attached to the udder, the teats certainly experience the necessary stimulation as a result of the pulsating teat cup liners. But should the attachment be made to an udder that has not been prepared, the problem lies in the fact that the first application of the stimulus and the start of the milk removal occur simultaneously. Because the milk ejection as a reaction to the stimulus occurs only after a delay of approximately one minute, however, only the so-called teat cistern milk can be removed from the udder at the start. This is released from the alveolar area in drops during the intermilking period and collects in the teat cistern. But because the teat cistern milk makes up only approximately 20% of the entire amount of milk stored in the udder, when the milking machine is placed on an udder that has not been pre-stimulated, it often happens that at the start of the milking, more milk is removed than the udder provides at this time. As a result, at the start of the milking a situation that corresponds to so-called over milking already occurs at the udder. Typical over milking occurs at the end of milking if the teat cup cluster is not removed on time and continues to work on an empty udder. The extremely damaging effect of over milking on the udder health has been documented by a number of international scientific studies and has generally been known for a long time.

The state of the art also includes carrying out the pre-stimulation with the help of the milking machine. In the publication DE 2746310 A1, it is proposed to act upon the outer side of the teat cup liners with less pressure than on the interior before the start of the milking process. This results in the teat cup liner lying around the teat, as a result of which milk is prevented from entering the milk line. In this way, the milk is not yet suctioned out of the udder, and the teat is massaged by the periodic pressure changes generated by the pulsator. The pre-stimulation can be carried out with the help of a device that comprises a throttle valve located between the teat cup cluster and the pulsator.

One disadvantage of this device is that it is designed in such a way that it is relatively large, and consequently, it is designed for permanent installation. As a result, this device cannot be used in milking systems for tie stalls, where the milking unit is carried by the milker from one cow to the next. Furthermore, the user must move back and forth during milking between the cow and the location at which the device is installed, which increases the time expenditure for the milking and which is perceived as ponderous. A further disadvantage of the device lies in the fact that the throttle valve is continually moved from a first position into a second position, so that an essentially linear pressure increase arises in the area between the teat cups and the teat cup liners. As a result, milk is already removed at a relatively early point in time. It would be desirable, however, first to stimulate the udder for a certain length of time and only then to begin with the actual milking.

Furthermore, the American patent U.S. Pat. No. 4,643,132 discloses a pulsator for milking machines that makes it possible to increase the frequency of the provided pressure pulses during a stimulation phase. An increased pulsation frequency is in no way unproblematic, however, because irritation to the mucous membrane can occur in the interior of the teats, which can cause long-term damage to the udder.

The use of a specially designed pulsator for pre-stimulation has the disadvantage that a farmer who would like to carry out pre-stimulation with the help of his/her milking machine must first obtain such a pulsator, which involves relatively high costs. Furthermore, pulsators with a built-in device for pre-stimulation are far from being available for all milking machine types and manufacturers. The main problem, however, lies in the fact that the pulsator represents the most sensitive component of the milking machine system, and so its characteristics (such as pulse frequency, length of the suction phase, steepness of the rising and falling flanks, etc.) must be very precisely coordinated to the other influencing factors and machine components (such as hardness and diameter of the teat cup liner, volume of the pulsation chamber, teat cup cluster weight, length and diameter of the control hoses, adjustment of the milking vacuum height, etc.). This is also one of the reasons that the characteristics of the pulsators vary for various milking machine types and manufacturers. Due to worries about injury to the udder and irreversible milk yield reductions caused by the milking machine, as well as due to unclear liability issues in case of damage, farmers fundamentally avoid combining machine components from various manufacturers.

OBJECT OF THE INVENTION

In view of these problems, there is a need for a device that can be conveniently and uncomplicatedly used, economically manufactured and integrated into existing milking machines without major effort, whereby the existing pulsator characteristics remain unchanged during the normal milking process, and with which adequate pre-stimulation of the udder can be carried out in a manner appropriate to the species, and namely essentially without additional time expenditure per animal.

SUMMARY OF THE INVENTION

According to one aspect of the present invention, this object is solved by a device for stimulating an udder during milking with a housing that can be grasped by a hand. The housing has a first connection and a second connection. The first connection is suitable for connection to a pulsator and the second connection is suitable for connection to a teat cup. A throttle valve is interposed in the housing between the first connection and the second connection. Furthermore, a control device is housed in the housing. This control device is designed to move the throttle valve from a partially closed position into an open position after a defined length of time.

The device can be inserted into a control line from the pulsator to the teat cup close to the teat cup cluster by means of a housing that can be grasped by a hand. In this way, it is easily accessible to the user while the teat cup cluster is being attached and during the milking, so that the user does not have to go away from the animal being milked. The device can be used together with a conventional pulsator. The characteristics of the given pulsator remain unchanged during the actual milking phase. The udder is stimulated at the frequency specified by the pulsator, so that no irritation of the teats occurs as a result of a high pulsation frequency. Because the throttle valve is not moved into the open position until after a defined length of time, the physiologically necessary clear separation of pre-stimulation and milking can be achieved. Furthermore, the device for stimulating an udder during milking can easily be built into an already existing milking machine subsequently. In this way, the effort that arises when changing over to milking with machine pre-stimulation is reduced.

The device suitably has a total length of not more than 15 cm. Due to the small size, the device can easily be built into the immediate working area of the milker, and can be conveniently operated with one hand.

The device advantageously has a total weight of not more than 150 grams. Due to the low weight, the total weight of the teat cup cluster (order of magnitude: 2-4 kg) is not influenced when the device is installed directly at the teat cup cluster in a manner favourable to grasping. As a result, effortless handling and easy transport are ensured.

In a further advantageous development of the invention, the control device comprises an adjustment device for adjusting the defined length of time. In this way, the duration of the pre-stimulation can be varied and individually adapted to the animal to be milked.

The adjustment device suitably comprises a striking mechanism that is designed to generate an acoustic signal and/or a signal that can be felt in the hand should a value that exceeds a threshold value be set for the specified length of time. In this way, the pre-stimulation time intended for the corresponding cow (e.g., 90, 60, 45, or 30 seconds) can also be adjusted without looking, and it is possible to avoid operator errors that lead to setting a pre-stimulation time that is too short.

The control device is advantageously formed in such a way that it is independent of outside energy. In this way, the mobility of the device is improved and the installation of the device is simplified.

The control device is suitably designed to be driven by the pressure effects coming from the pulsator. In this way, the device does not need its own power source, as a result of which no running expenses arise and disruptions in operating the device that, for example, can be caused by empty batteries, can be avoided.

The control device advantageously comprises a volume that is enclosed by a membrane and that is in a fluid flow connection with the first connection. An exterior side of the membrane is exposed to atmospheric pressure. A transmission device is designed to convert movements of the membrane that are caused by pressure differences in the volume into rotational movement of a toothed wheel. A slide valve that acts on the throttle valve is designed to be slid as a result of the rotational movement of the toothed wheel. This allows reliable drive of the device by means of pressure pulses that originate with the pulsator.

The slide valve suitably has a projection on the side facing away from the throttle valve, which projection engages in a groove formed in the toothed wheel. In this way, the slide valve can be moved back and forth by the rotational movements of the toothed wheel. Due to the shaping of the groove, it is possible to regulate the progression in time of the movement of the slide valve and consequently the sequence of the restriction of the airflow between the teat cup and the pulsator caused by the throttle valve.

The toothed wheel advantageously has a gap without teeth along its circumference. In this way, the rotational movement of the toothed wheel can be stopped when the transmission device has reached the gap.

In a further advantageous development of the invention, the throttle valve can be electrically switched between the partially open position and the open position. The control device comprises a switching circuit suitable for switching the throttle valve. As a result of the electronic control of the throttle valve, a particularly flexible adjustment of the progression in time of the restriction of the airflow between the pulsator and the teat cup is made possible.

The switching circuit suitably comprises an electronic timer and is designed to switch the throttle valve when a signal is received from the electronic timer. Because electronic timers can be procured economically, the use of such components can keep down the manufacturing costs of the device for stimulating an udder during milking.

In a further advantageous development of the invention, the switching circuit comprises a pressure sensor that is in a fluid flow connection with the first connection and that is designed to start the electronic timer when a pressure pulse is detected. In this way, the counting of the pre-stimulation time can be automatically started by the electronic timer.

The device for stimulating an udder during milking furthermore advantageously has a pair of first connections and a pair of second connections. A throttle valve is disposed between one of the first connections and one of the second connections in each case. The control device is designed to move both throttle valves from the partially closed position into the open position after the defined length of time. In this way, even in a milking machine with alternating pulsation in which half of the animal's teats are alternatingly subjected to a pressure pulse from the pulsator, only a single device is necessary.

The throttle valve suitably comprises a pressure regulation valve. In this way, the vacuum provided at the second connection during the pre-stimulation can be adjusted to a specified value.

In a further advantageous development of the invention, the pressure regulation valve comprises an adjustable elastic element. In this way, it is possible to carry out a fine adjustment of the specified vacuum.

The device suitably comprises a slide valve that can be manually tensed against a spring force and locked into place and that is designed to act on the throttle valve. An electrically controllable unlocking device is designed to release the slide valve from its locked-in position when a signal is received from the switching circuit. In this way, a considerable portion of the energy needed for switching the throttle valve can be provided in the form of elastic energy. As a result, the power consumption of the device can be reduced.

BRIEF DESCRIPTION OF THE DRAWINGS

The invention will now be explained in more detail using embodiments and the accompanying drawings that refer to these embodiments. Shown are:

FIG. 3b a schematic cross-sectional view of a throttle valve in the device shown in FIG. 3a;

FIG. 3c to 3e schematic perspective views of parts of the device shown in FIG. 3a;

FIG. 4b a schematic circuit diagram of a switching circuit in the control device shown in FIG. 4a;

DETAILED DESCRIPTION OF THE INVENTION

An embodiment of the invention will be explained using FIG. 3a to FIG. 3d.

Figure 3A:
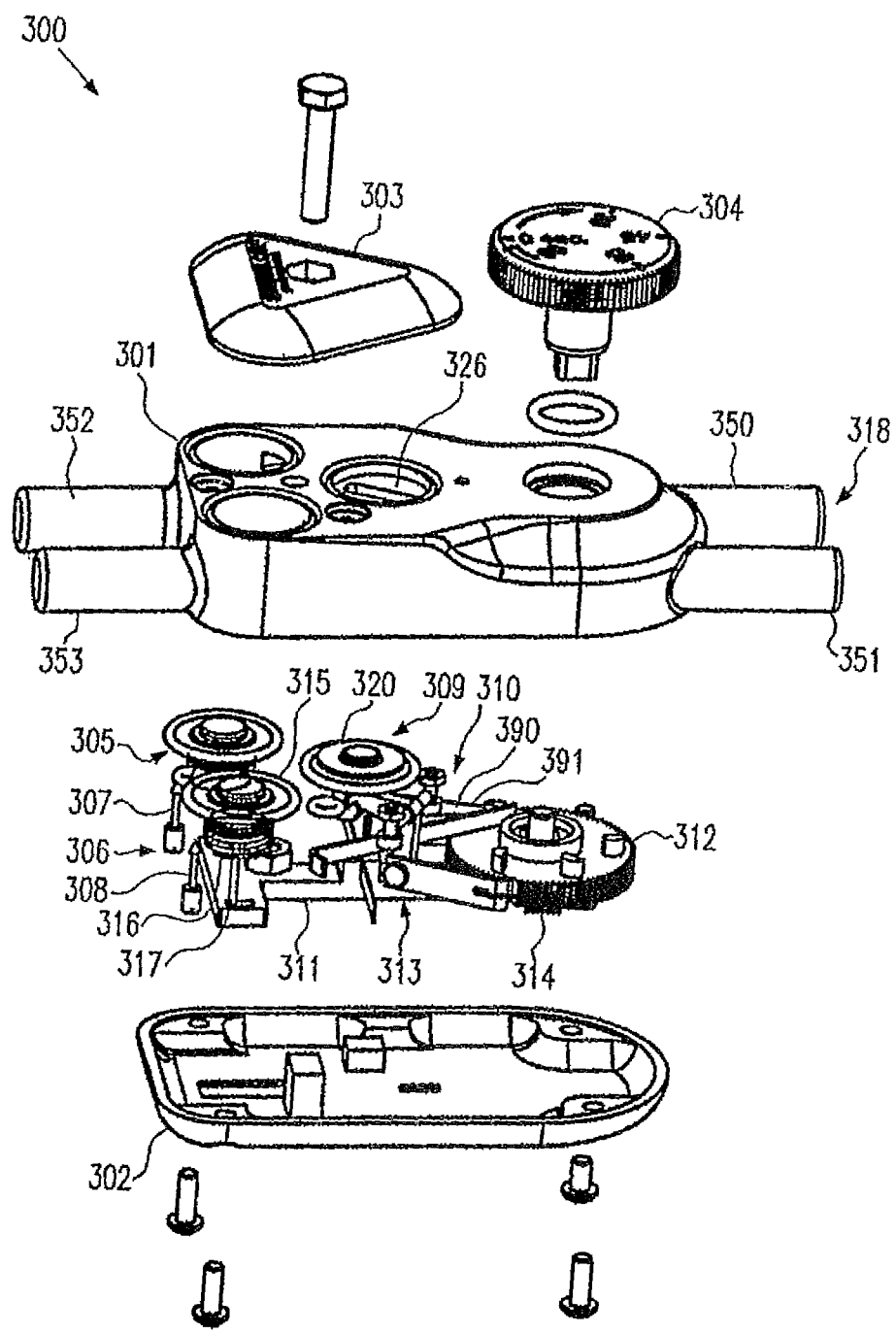
FIG. 3a a schematic exploded view of a device for stimulating an udder during milking according to an embodiment of the present invention.

FIG. 3a shows a schematic exploded view of a device 300 for stimulating an udder during milking according to an embodiment of the present invention.

The device 300 comprises a housing 318. The housing 318 comprises an upper housing part 301, a lower housing part 302 and a cover 303. The housing 318 has a pair of first connections 350, 351 and a pair of second connections 352, 353. The first connections 350, 351 are suitable for connection to a milking machine pulsator. The second connections 352, 353 are designed for connection to teat cups of the milking machine.

Two throttle valves 305, 306 are situated in the housing. The throttle valve 305 is arranged between the connections 350, 352 and is designed to regulate a flow of gas between the connections 350, 352. The throttle valve 306 is correspondingly arranged in a fluid flow connection with the other two connections 351, 353, and is designed to regulate a flow of gas between the connections 351, 353.

Figure 3B:
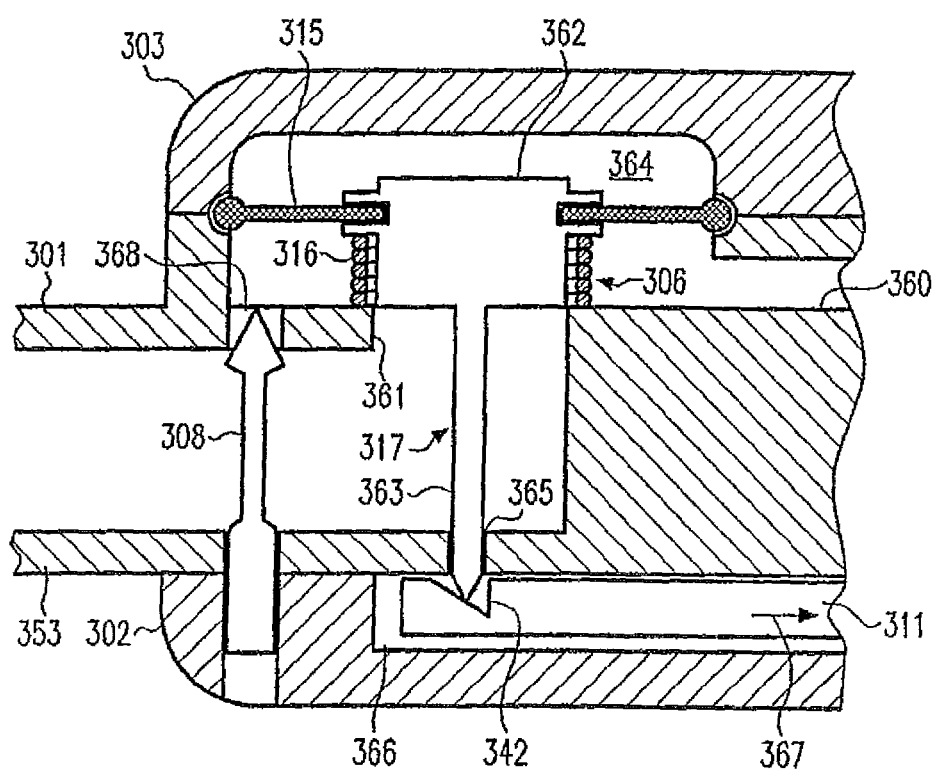

The configuration of the throttle valves 305, 306 is explained in the following using the throttle valve 306 as an example, whereby FIG. 3b shows a schematic cross-sectional view of this throttle valve 306. The throttle valve 305 has essentially the same configuration. The throttle valve 306 has a membrane 315. The membrane 315 is clamped at its outer circumference between the first housing part 301 and the cover 303 and is held in its position by this means. The membrane 315 is connected at its middle to a plunger 317. A compression spring 316 exerts a force on the plunger 317 in the direction of the cover 303.

The plunger 317 has a head 362 and a rod 363. The head 362 is arranged close to an opening 361 that produces a fluid flow connection between the second connection 353 and a conduit 360, which is connected to the first connection 351. Depending on the position of the plunger 317, a flow of gas through the opening 361 is more or less strongly restricted by the head 362 of the plunger 317. The farther the plunger is slid in the direction towards the cover 303, the less the resistance to which the flow of gas is exposed by the valve 306.

A chamber 364 above the membrane 315 can be in a fluid flow connection with the surroundings of the device 300 by means of a pressure equalization conduit (not shown). A filter membrane made of a material that is permeable to air but not to water can be provided in the connecting area between the chamber 364 and the surroundings. By this means, penetration of moisture into the interior of the device 300 and therefore the accompanying contamination of components of the device 300 can advantageously be avoided. In a special embodiment of the present invention, the filter membrane can be made of porous Teflon or a Porotex foil.

Consequently, the membrane 315 is exposed to atmospheric pressure on one side and to the pressure that prevails in the conduit 360 on the other side. During operation of the device 300, the connection 351 is connected to a pulsator which gives a periodic pressure progression that oscillates between the atmospheric pressure and a pressure that is less than the atmospheric pressure, at a frequency of roughly 1 Hertz. If the pressure in the connection 351 and in the conduit 360 in a fluid flow connection with it is smaller than the atmospheric pressure, a force t, which opposes the force exerted by the compression spring 316 and which is directed away from the cover 303, acts on the membrane 315.

The more the pressure in the conduit 360 differs from the atmospheric pressure, the further the plunger 317 moves towards the opening 361. This enlarges the flow resistance of the valve 306. This flow resistance counteracts a further reduction of the pressure in the connection 353. Conversely, the plunger 317 moves away from the opening 361 when there is a small difference in pressure between the conduit 360 and the surrounding air pressure, as a result of which more gas can flow through the connection 353. Consequently, the valve 306 is in a partially open position in which gas can flow through the valve 306 but no complete pressure equalization can take place between the conduit 360 and the connection 353 while the pulsator is operating. If the movement of the plunger 317 is not hindered, a pressure that is different than that of the surroundings appears in the connection 353 that is connected to the pulsation chamber of the teat cup, whereby this difference depends on the stiffness of the compression spring 316 and the surface of the membrane 315. Accordingly, in this case the throttle valve 306 acts as a pressure regulation valve that is designed to prevent the pressure in the connection 353 from differing from the atmospheric pressure by more than a defined amount.

Figure 5:
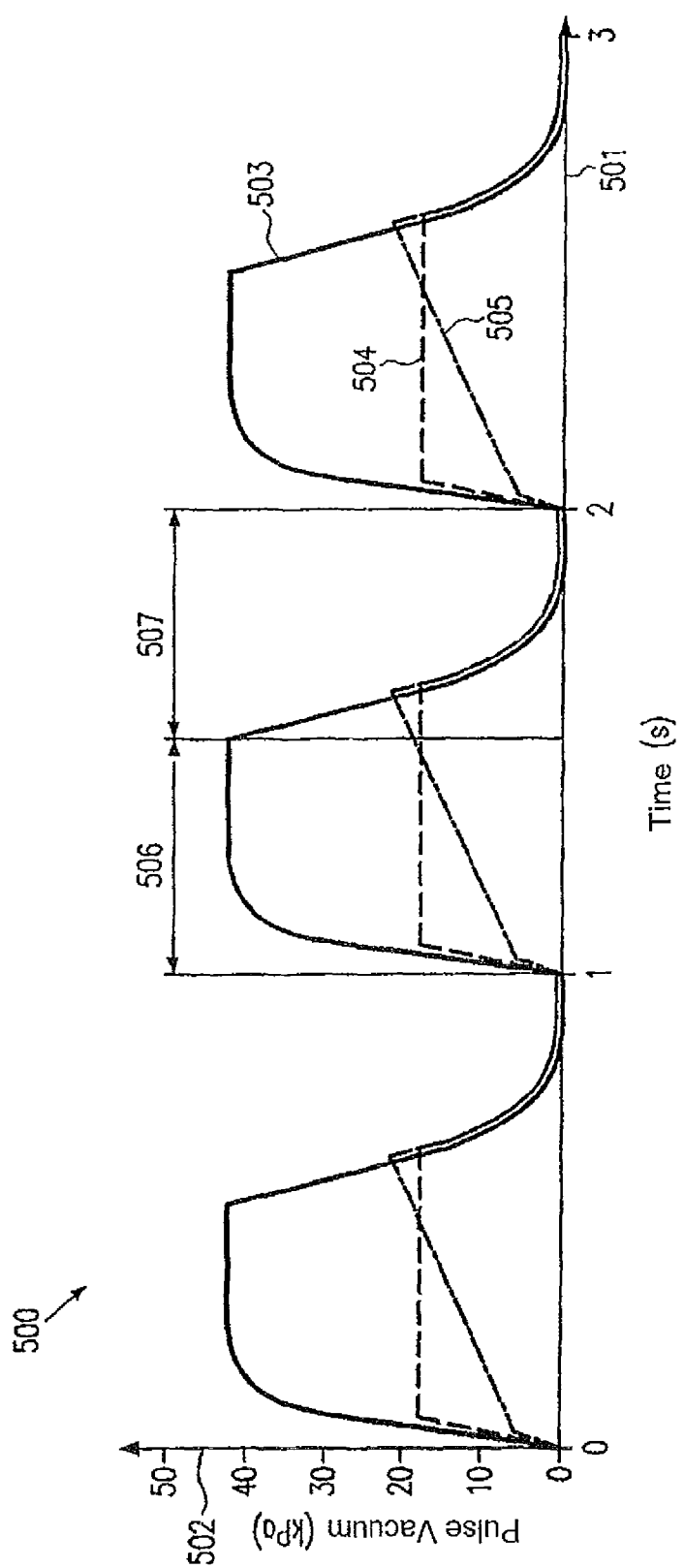
FIG. 5 a schematic sketch of pressure curves during pre-stimulation with a device according to the present invention.

FIG. 5 shows a schematic sketch of pressure progressions during pre-stimulation with a device according to the present invention.

The pressure progression is plotted over time in a coordinate system 500 with a time axis 501 and a pressure axis

502. A first curve 503 represents the progression over time of the pulse vacuum provided by the pulsator. The pulse vacuum is the difference between the pressure in the first connection 351 and the surroundings of the device 300. At the start of each pressure pulse, the pressure falls to a level of approximately 40 kPa below the atmospheric pressure during a suction phase 506. During a relief phase that then follows, the pressure increases until the atmospheric pressure has essentially been reached again. Each pulse cycle can have a duration of approximately one second. In many pulsators, the duration of the suction phase is longer than that of the relief phase.

A second curve 504 represents the pressure progression that appears in the second connection 353 if the freedom of movement of the plunger 307 is not restricted. At the start of each pressure pulse, the pressure in the connection 353 essentially follows that given by the pulsator and prevailing in the conduit 360, until the defined difference in pressure, which in some embodiments of the invention can have a value of approximately 17 to 22 kPa, is reached. In a special embodiment of the invention, the value of the defined difference in pressure can lie in a range of approximately 18 to 20 kPa. Subsequently the pressure remains constant until such a time as the difference between the pressure given by the pulsator and the atmospheric pressure again falls below the defined pressure difference. Thereupon the pressure in the second connection 353 again essentially follows the pressure given by the pulsator. The vacuum in the connection 353 consequently pulses between zero and approximately 22 kPa. The teat cup liner correspondingly moves between a completely closed (full atmospheric pressure in the pulsation chamber) and a less closed (reduced vacuum in the pulsation chamber) position. During this pulse curve progression, there is essentially no removal of the milk yet. Nevertheless, the teats are lightly massaged by the pressure pulses of the pulsator, which is fully sufficient for applying adequate stimulating pulses.

The chamber 364 above the membrane 315 does not have to be connected to the surroundings of the device 300. In other embodiments, the chamber 364 can be connected to the first connection 351 and therefore to the conduit 360 via a connection conduit. A restrictor element, for example a nozzle, is provided in the connection conduit, whereby this restrictor element counteracts a flow of gas between the chamber 364 and the first connection 351 with a relatively large resistance. As a result, the pressure in the chamber 364 drops only slowly if the pulsator provides a pressure pulse. If the movement of the plunger 317 is not hindered, a pressure that is different than that in the chamber 364 by a defined value appears in the connection 353. The defined value depends on the stiffness of the compression spring 316 and the surface of the membrane 315. Due to the slow reduction of pressure in the chamber 364, the pressure in the connection 353 drops only slowly during a pressure pulse from the pulsator, as indicated by the curve 505 in FIG. 5. In this way, a particularly gentle pre-stimulation of the udder of the animal being milked can be achieved.

The rod 363 of the plunger 317 protrudes through an opening 365 in the first housing part 301 into a chamber 366 that is formed between the first housing part 301 and the second housing part 302 and in which a slide valve 311 is located. The slide valve 311 can move in the direction of an arrow 367 and the opposing direction, and has a wedge-shaped recess 342 on a side facing the rod 363. Depending on the position of the slide valve 311, the freedom of movement of the rod 363 and consequently the freedom of movement of the entire plunger 317 are more or less strongly restricted by the slide valve 311, namely more strongly the further the slide valve 311 is slid in the direction of the arrow 367. Consequently, the effect of the valve 306 is mechanically inhibited.

The further the slide valve 311 is slid in the direction of the arrow 367, the more the plunger 317 is hindered from moving towards the opening 361 and restricting the flow of gas through the throttle valve 306. As a result of this, the throttle valve 306 is completely opened and the pressure in the connection 353 essentially follows the pressure given by the pulsator.

The complete opening of the valve 306 does not have to be brought about by a mechanical restriction of the freedom of movement of the plunger 317, as described above. In other embodiments of the present invention, the slide valve 311 can be designed to release a connection between the chamber 364 above the membrane 315 and the conduit 360 when it is slid in the direction of the arrow 367. At the same time, the connection conduit between the chamber 364 and the surroundings of the device 300 can be closed by the slide valve 311. Consequently, after the slide valve 311 is slid, the pressure in the chamber 364 is essentially equal to the pressure in the conduit 360 and the membrane is no longer pressed towards the opening 361 by the gas pressure. The compression spring 316, however, continues to exert a force on the head 362 of the plunger 317, as a result of which the head 362 moves away from the opening 361 and releases the opening 361.

In addition to the opening 361, a bypass opening 368 can be provided in the valve 306, whereby this bypass opening 368 can likewise provide a fluid flow connection between the connection 353 and the conduit 360. The bypass opening 368 can be completely or partially released or closed by an adjusting screw 308. Consequently, by turning the adjusting screw 308, a fine adjustment of the pressure in the connection 353 can be made.

A fine adjustment of the pressure in the conduit 360 does not have to be made by means of partially opening or closing a bypass opening. In other embodiments of the present invention, the compression spring 316 can instead be replaced with an adjustable elastic element. The adjustable elastic element can, for example, comprise a spring that is connected on one end to an adjusting screw and on the other end to a lever to which the plunger 317 is attached. When the plunger 317 moves, the lever rotates around a pivot point. A force that is exerted by the spring is transmitted to the plunger 317 by the lever. By adjusting the adjusting screw, the spring can be moved towards the lever or away from it, as a result of which the force exerted by the spring on the lever changes. In this way, the pressure that appears in the connection 353 changes.

In other embodiments of the invention, the adjustable elastic element can comprise a flat spring. The flat spring is attached at one end to the plunger 317. The other end of the flat spring is connected to the housing 318 by means of an attachment. The flat spring is held between the attachment and the plunger 317 by a support that can be moved along the length of the flat spring. When the plunger 317 moves, a part of the flat spring is bent between the plunger 317 and the support. The further the support is moved towards the plunger 317, the shorter the bent part of the flat spring is and the greater the spring stiffness of the bent part of the flat spring becomes. Consequently, the pressure that appears in the connection 353 can be regulated by moving the support.

The device 300 furthermore comprises a control device 309. The control device 309 comprises a volume 326 that is sealed off by a membrane 320, whereby this volume 326 is, in the embodiment shown in FIG. 3a, located on a side of the membrane 320 facing the cover 303 and sealed off by the cover 303. The volume 326 is in a fluid flow connection with one of the first connections 350, 351, for example the connection 351. An exterior side of the membrane 320 facing away from the cover 303 is exposed to atmospheric pressure. A filter membrane made of a material that is permeable to air but impermeable to water can be provided in a connection between the exterior side of the membrane 320 and the surroundings, in order to prevent moisture and dirt from penetrating into the device 300. In one embodiment of the present invention, a shared ventilation opening, sealed off by a filter membrane, can be provided for connecting the exterior side of the membrane 320 to the surroundings and for connecting the chamber 364 to the surroundings. The membrane 320 is elastic and can be moved by means of differences in pressure in the volume 326 that it seals off.

Figure 3C:
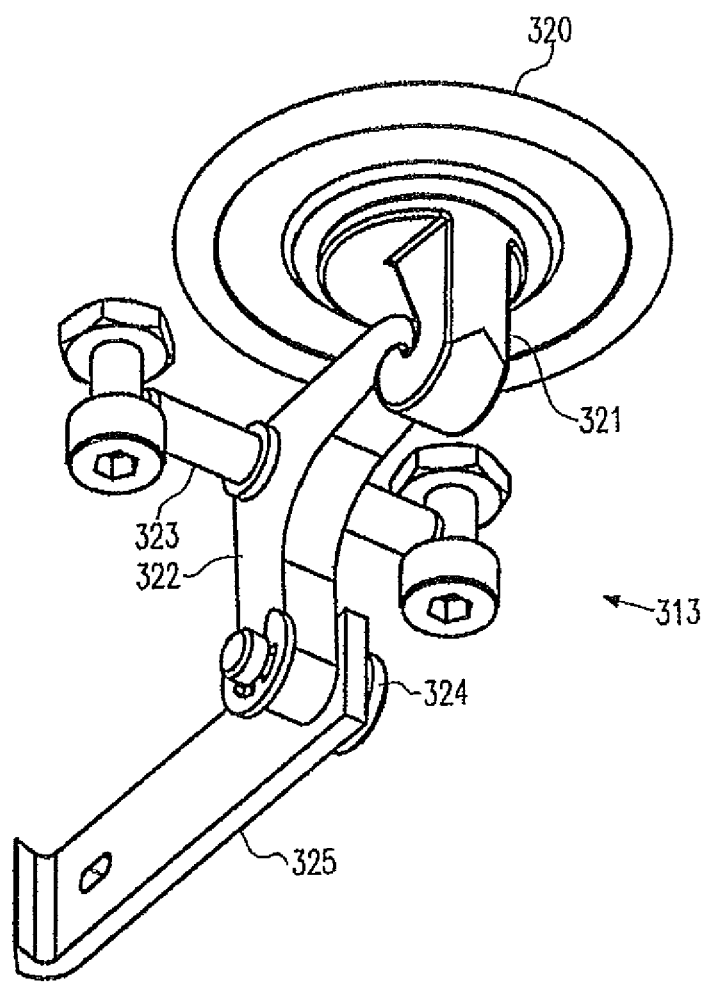

A transmission device 313 is designed to convert movements of the membrane 320 that are caused by pressure differences in the volume 326 into a rotational movement of a toothed wheel 312. A schematic perspective view of the transmission device 313 in one embodiment of the invention is shown in FIG. 3c.

The transmission device 313 comprises a hub 321 that is attached to the exterior side of the membrane 320. The hub 321 engages in a bent lever 322 that is held in such a way that it can rotate around an axle 323. One end of the lever 322 is connected to a rear end of a hook 325 by means of a shaft 324. When the pressure in the volume 326 falls following a vacuum pulse supplied by the pulsator, the middle section of the membrane 320 is pulled some distance into the volume 326. As a result, the hub 321 moves towards the cover 303 and the lever 322 is rotated around the axle 323. At the same time, the lever 322 pulls the hook 325 back. If the pressure in the volume sealed off by the membrane 320 increases again, the hook 325 moves forwards again. The forward movement of the hook 325 is additionally supported by a force that is exerted by a tension spring 314.

The transmission device does not have to comprise a hub 321 that engages in a bent lever 322. In other embodiments of the present invention, the transmission device can instead comprise a cord that runs over a deflection roller or a hinged bracket.

Figure 3D:
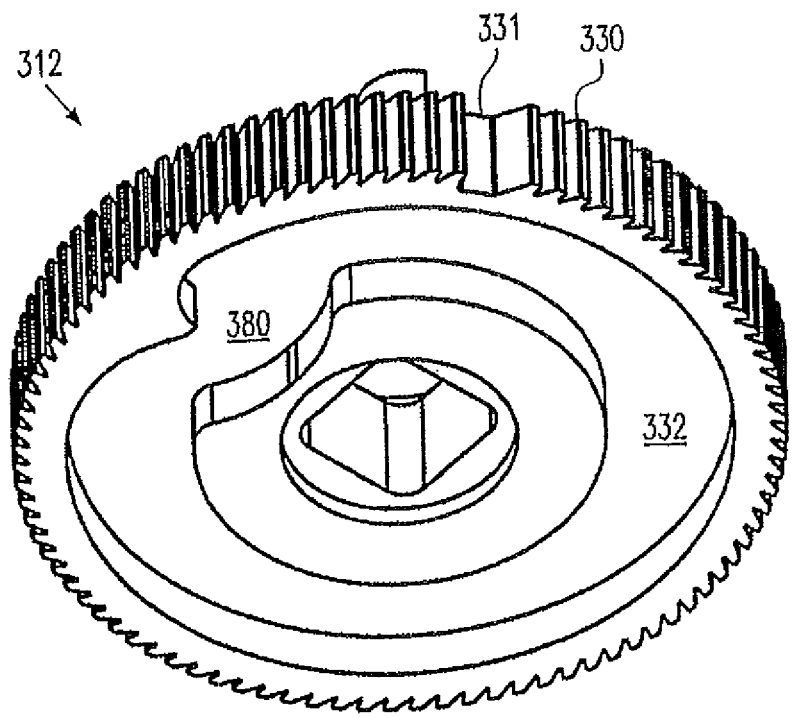

A schematic perspective view of the toothed wheel 312 is shown in FIG. 3d. A front end of the hook 325 engages in teeth 330 of the toothed wheel 312. The teeth 330 have an asymmetric shape. This is designed in such a way that a tooth that is located next to the front, bent end of the hook 325 is inclined towards the front end of the hook 325. When the hook 325 moves back, the hook holds on to the tooth and pulls it back. In this way, the toothed wheel 312 rotates one step.

When the hook 325 moves forward again, the hook 325, because of the asymmetric shape of the next tooth, glides to the next tooth without engaging in it, so that the toothed wheel is no longer rotated back. In order to simplify the forward movement of the hook 325 over the next tooth, the hook 325 can be formed from an elastic material, such as, for example, spring steel or from an elastic plastic, such as highly polymerized polyoxymethylene (POM).

In addition, bolts 390, 391 can be provided in the device 300, whereby these bolts 390, 391 prevent the toothed wheel 312 from rotating back. Each of the bolts 390, 391 can be equipped with a limit stop (not shown) known to the person skilled in the art, whereby this limit stop is designed to prevent a forcible bending of the bolts when the toothed wheel 312 is rotated back. The bolts 390, 391 can be formed from an elastic material, such as, for example, spring steel or from an elastic plastic, such as highly polymerized polyoxymethylene (POM).

The dimensions of the components of the transmission device 313 and the teeth 330 of the toothed wheel 312 can be designed in such a way that the toothed wheel 312 rotates one tooth farther each time the hook 325 is pulled back. The toothed wheel 312 can have a gap 331 in which no teeth are present. Because the hook 325 cannot engage in any teeth in the gap 331, the rotation of the toothed wheel 312 stops as soon as the toothed wheel 312 is in a position in which the gap 331 lies across from the hook 325.

Figure 3E:
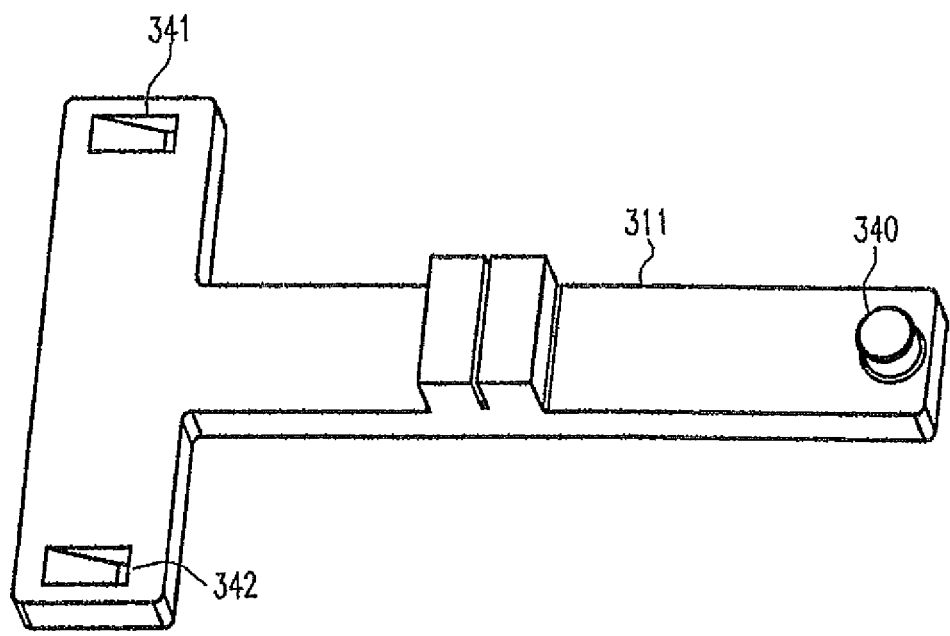

FIG. 3e shows a schematic perspective view of the slide valve 311. The slide valve 311 has a T-shaped form. It has two wedge-shaped recesses 341, 342. As explained above, the rod 363 of the plunger 317 in the throttle valve 306 engages in the recess 342. Correspondingly, a rod of a plunger in the throttle valve 305 engages in the recess 341.

On a side facing away from the throttle valves 305, 306, the slide valve 311 has a projection 340. This engages in a groove 332 that is arranged on a side of the toothed wheel 312 that lies opposite the second housing part 302. When the toothed wheel 312 rotates, the projection 340 of the slide valve 311 is guided by the groove 332.

A distance of the groove 332 from a centre point of the toothed wheel 312 can vary along the circumference of the toothed wheel 312. In particular, the groove 332 can comprise an area 380 that is at a lesser distance to the centre point of the toothed wheel 312 than is the rest of the groove 332. The area 380 can be arranged in such a way that the projection 340 of the slide valve 311 is located in the area 380 of the groove 332 when the hook 325 engages in the gap 331 and the rotational movement of the toothed wheel 312 stops. The rest of the groove 332 can be located at a greater distance to the centre point of the toothed wheel 312. The distances of the area 380 and the rest of the groove 332 to the centre point of the toothed wheel 312 can be designed in such a way that the plungers of the valves 305, 306 can move essentially unhindered as long as the projection 340 of the slide valve 311 is located outside the area 380. When the area 380 reaches the projection 340, the slide valve is moved in the direction of the arrow 367 shown in FIG. 3b and the valves 305, 306 are opened.

The device 300 does not have to have a separate slide valve 311. In another embodiment, the groove 332 in the toothed wheel 312 can have a distance to the centre of the toothed wheel 312 that is always the same. The valve 306 is arranged in a relationship to the toothed wheel 312 in such a way that the end of the rod 363 of the valve 306 sticks out directly into this groove. The depth of the groove falls off in a wedge-shaped manner in the area in which the movement of the toothed wheel 312 stops because the hook 325 engages in the gap 331. In this area, the reduced depth of the groove hinders the freedom of movement of the rod 363 of the plunger 317 and consequently the valve opens. During the revolution of the toothed wheel 312, there is no hindering of the freedom of movement of the valve 306.

The device 300 furthermore comprises an adjustment device. The adjustment device comprises a rotary knob 304. The rotary knob 304 is connected to the toothed wheel 312. Consequently, the toothed wheel 304 can be rotated by turning the rotary knob 304.

Figure 1:
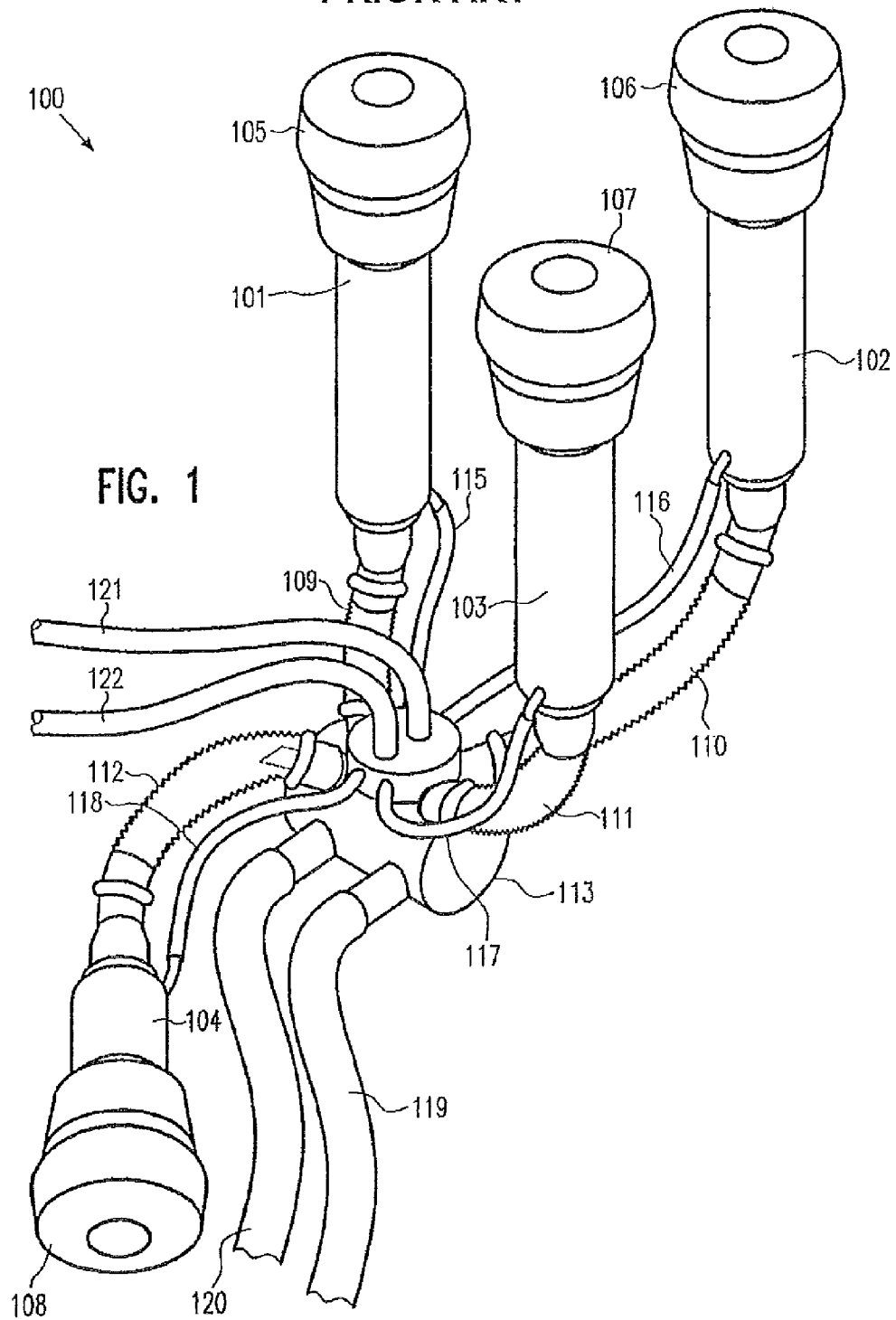
FIG. 1 a schematic perspective view of a teat cup cluster in a milking machine according to the state of the art.
Figure 2:
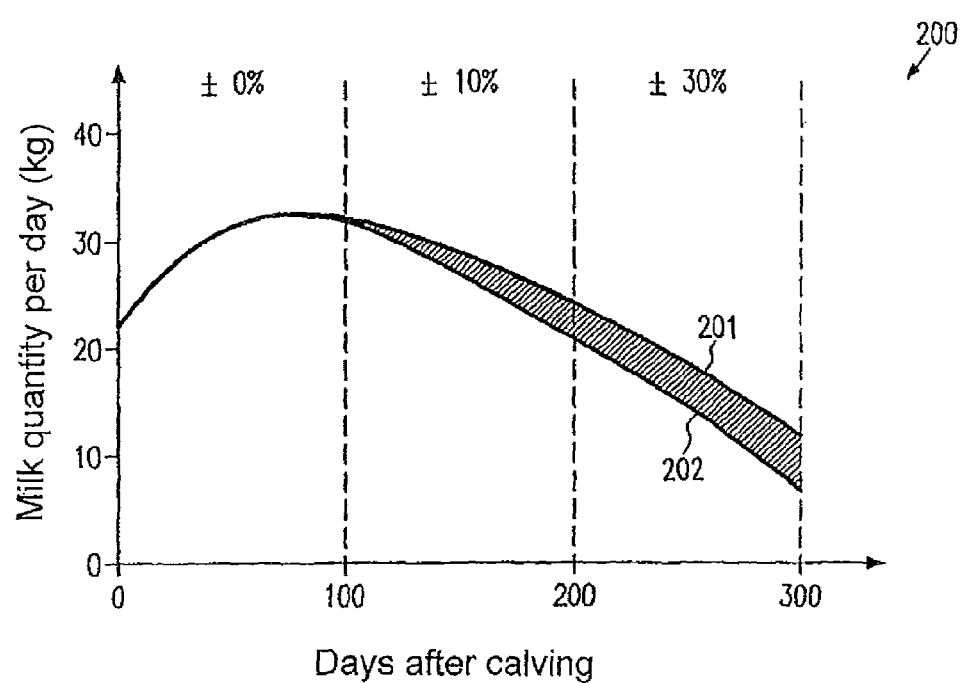
FIG. 2 a schematic sketch of the chronological progression of the milk yield of a cow when milked with sufficient pre-stimulation and when milked without sufficient pre-stimulation.

During operation, the device is inserted between the pulsator and the teat cups of a milking machine, in a manner similar to the above description with reference to FIG. 1. To this end, each of the control lines 121, 122 can be connected to one of the first connections 350, 351. Each of a further pair of lines connects one of the second connections 352, 353 to those connections of the teat cup cluster 100 to which the control lines 121, 122 in FIG. 1 are connected.

First the milking machine is switched on. Directly before the attachment of the teat cup cluster to the udder of the next animal, the toothed wheel 312 is, by means of turning the rotary knob 304 clockwise, brought into a position in which the hook 325 is located a defined number of teeth in front of the gap 331. The pulsator of the milking machine generates pressure pulses that act on the membrane 320. In this way, the membrane 320 moves. The toothed wheel 312 is rotated farther by one tooth with each pressure pulse by means of the transmission device. The toothed wheel does not come to a stop until the hook 325 has reached the gap 331. Because the pulsator emits its pressure pulses with a defined frequency, the toothed wheel 312 rotates at a defined speed until such a time as the hook 325 has reached the gap 331.

After the rotary knob 304 has been adjusted, the projection 340 of the slide valve 311 is located outside the area 380 of the groove 332 and the plungers of the valves 305, 306 can essentially move freely. In this way, during the suction phase of the pulsator, a vacuum, which is smaller than the vacuum given by the pulsator and smaller than the vacuum generated in the interior of the teat cup liners 105-108 and which is determined by the construction of the valves, appears in the second connections 352, 353 that are connected to the pulsation chambers. As a result, the teat cup liners 105-108 are stretched away from the walls of the teat cups 101-104 and pressed so strongly against the teats of the animal that the streak canal just barely remains closed. Accordingly, there is essentially no removal of the milk. Nevertheless, the teats are lightly massaged by the pressure pulses of the pulsator, as a result of which there is adequate application of the stimuli for the pre-stimulation of the udder of the animal.

When the device 300 is operated, it is important that it be put into the state of pre-stimulation by the milker before the teat cups are attached to the teats and that the milker does not wait to do this until shortly after the attachment. The reason is the following: When the milking machine has been switched on, the milking vacuum does not build up in the interior of the teat cup liner until the moment in which the teat is inserted into the teat cup liner in a manner that forms a seal. Before the insertion, atmospheric pressure prevails in the interior of the teat cup liner, while in the enclosed pulsation chamber between the teat cup liner and the teat cup wall, the periodic pressure progression between atmospheric pressure and a vacuum provided by the pulsator via the control lines 121, 122 is present. The teat cup liner wall is consequently not exposed to any difference in pressure in the relief phase in the state before insertion, so that the teat cup liner takes on its original open position. During the suction phase of the pulsator, on the other hand, there is a difference in pressure in the teat cup, which has not yet been attached, which stretches the teat cup liner wall outwards towards the teat cup wall. Given the pressure progression of a teat cup operated by a normal pulsator, if one attaches the teat cup to a teat that has not been pre-stimulated and so is still slack, the teat cup has the tendency to suck the teat especially deeply into the teat cup liner interior during the respective suction phase before a sealing contact has been made between the teat cup liner wall and the teat skin and consequently before a great amount of friction can develop that can counteract further suctioning of the teat into the teat cup. It is possible to avoid suctioning the teat deeply when the teat cup is attached, and therefore to prevent the dreaded "over milking" situation at the start of the milking, by restricting the suction phase of the pulsator to a reduced vacuum by means of the device according to the invention even before the attachment of the teat cups. Consequently, the seal and friction between the teat skin and the teat cup liner wall appear so quickly during attachment that the teat cup automatically takes on an optimal milking position on the teat after the attachment. During the time of the pre-stimulation, the circulation in the teat is increased by the nervous stimulation pulses of the gently pulsating teat cup liner, as a result of which the teat changes from an originally slack state into a stiffer one, which further stabilizes the correct position of the teat cup on the teat.

Once the area 380 of the groove 332 has reached the projection 340 of the slide valve 311, the slide valve 311 is moved in the direction of the arrow 367 and the valves 305, 306 are opened. In this way, the vacuum supplied by the pulsator can essentially act unhindered on the teat cup liners 105-108 and milk can be removed from the udder of the animal. At this time, the hook 325 also reaches the gap 331, so that the projection remains in the area 380 and the valves 305, 306 remain opened during the rest of the milking process.

The length of time during which the plungers of the valves 305, 306 can move freely and therefore the duration of the pre-stimulation are determined by the position of the toothed wheel 312 when the teat cup cluster is attached, whereby this position can be adjusted with the rotary knob 304, and by the frequency of the pressure pulses provided by the pulsator. Because the frequency of the pressure pulses is essentially constant and on the order of roughly 1 Hz, pre-stimulation can be carried out for a defined length of time.

As explained above, the toothed wheel 312 turns one tooth farther with each pressure pulse provided by the pulsator. Accordingly, the duration of the pre-stimulation is essentially equal to the product of the length of a pressure pulse and the number of teeth that are located between the lever 325 and the gap 331 at the initial position of the toothed wheel 312 when the teat cup cluster is attached. The maximum duration of the pre-stimulation is determined by the total number of teeth on the toothed wheel 312. In a special embodiment of the present invention, the toothed wheel 312 has 90 teeth.

To set the pre-stimulation time, the toothed wheel 312 can be rotated in the same direction in which it also rotates when the device 300 is operated. Rotation of the toothed wheel 312 and the rotary knob 304 connected to it in the opposite direction is prevented by the bolts 390, 391. If the rotary knob 304 is turned through a large angle, a relatively short pre-stimulation time is selected, while turning the rotary knob 304 through a small angle leads to a longer pre-stimulation time. Because in practice, it has been seen that there is generally a tendency towards short pre-stimulation times, it has proven advantageous to adjust shorter pre-stimulation times by consciously turning the rotary knob 304 farther.

In some embodiments of the present invention, the rotary knob 304 can be connected to a striking mechanism that is designed to generate an acoustic signal and/or a signal that can be felt in the hand if the rotary knob 304 is turned by an angle that corresponds to a specified pre-stimulation time. For example, the striking mechanism can be suitable for generating a signal when a pre-stimulation time of 30 seconds, 60 seconds and/or 90 seconds is selected. By this means, the pre-stimulation time that is adequate for the individual animal can advantageously be conveniently selected without looking. Furthermore, the probability of an incorrect setting of the pre-stimulation time is reduced.

According to the latest scientific findings, the adequate pre-stimulation time for an individual animal is determined by the level to which the udder is filled. The level to which the udder is filled is the relationship between the quantity of milk that is present in the udder before milking and the maximum capacity of the udder. The degree of filling in the udder is influenced, on the one hand, by the time that has elapsed since the last milking and, on the other hand, by the lactation status, meaning the time that has elapsed since the birth of the last young animal. The lower the level to which the udder is filled, the longer the pre-stimulation time must be. For cows, pre-stimulation times in the range between 90 and 30 seconds can be considered to be adequate. 60 seconds is considered to be the standard.

The size and weight of the device 300 can be designed in such a way that the device 300 can be comfortably held in one hand. In particular, the device 300 can be grasped by a hand. This is particularly the case when an average user who holds the device 300 in the hand in such a way that the second housing part 302 faces his/her palm can still touch the edge of the cover 303 and/or the rotary knob 304 with the fingers. In this case, the hand of the user encompasses more than half of the circumference of the device 300. In this way, the user can even securely hold the device 300 if it is wet or dirty. In some embodiments of the invention, the size of the device 300 can roughly correspond to the size of a piece of hand soap. In a special embodiment of the present invention, the device 300 can have a total length of not more than roughly 15 cm, measured from the ends of the first connections 350, 351 to the ends of the second connections 352, 353, and a weight of not more than 150 grams.

The device 300 can be positioned close to the teat cup cluster 100. It is then advantageously easily reachable for the milking machine operator when he/she attaches the teat cup cluster to the animal to be milked. In this way, the duration of the pre-stimulation can be adjusted without the operator having to move away from the animal.

The device 300 can be used together with a conventional pulsator. The specific pulse characteristics of the existing pulsator are not changed by building the device 300 into the actual milking phase. Furthermore, the device 300 can be produced economically, due to its relatively simple construction. Consequently, advantageously no large investments are necessary in order to switch over from milking without machine pre-stimulation to milking with machine pre-stimulation.

Figure 4A:
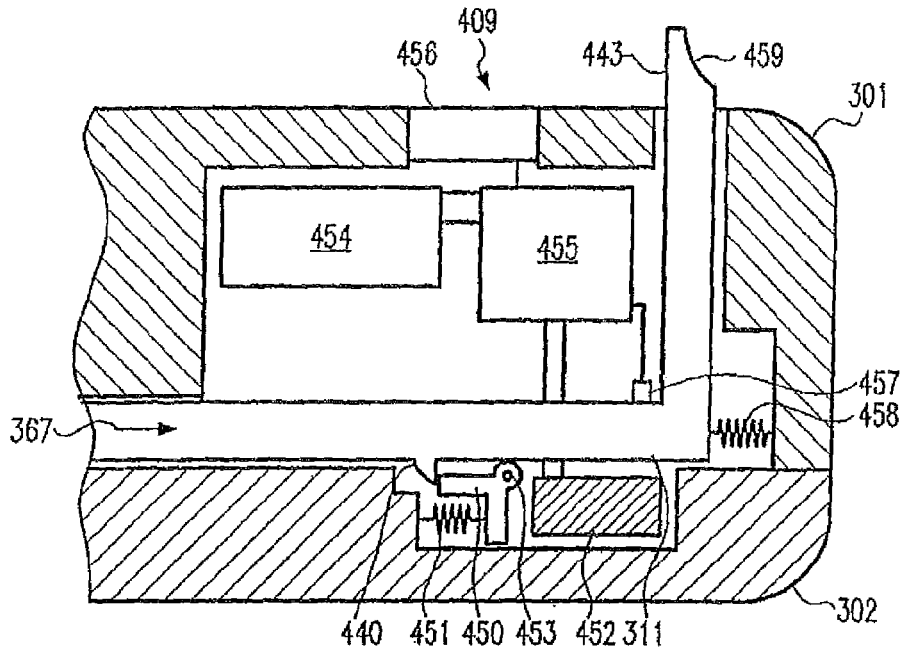
FIG. 4a a schematic cross-sectional view of a control device in a device for stimulating an udder during milking according to a further embodiment of the present invention.

The control device 309 of the device 300 for stimulating an udder during milking does not have to be configured as described above. FIG. 4 shows a schematic cross-sectional view of a control device 409 that can be used instead of the control device 309. The control device 409 comprises an electronic switching circuit 455 that is provided with electric current from a current source 454. The current source 454 can comprise a battery, for example. In a special embodiment of the present invention, the switching circuit 455 can comprise an electronic timer, a microprocessor, a memory unit and/or a switching device. The switching device can, for example, be provided in the form of a relay and can be designed to switch an electric current from the current source 454 to a coil 452. The switching circuit 455 can be designed to switch on the electric current to the coil 452 when a signal is received from the electronic timer.

A bent lever 450 is arranged opposite the coil 452, whereby the lever 450 is supported in such a way that it can rotate around an axle 453. The lever 450 can be made of a ferromagnetic material, such as an alloy that contains iron. In other embodiments, a small plate made of a ferromagnetic material can be attached to a first arm of the lever 450 that faces the coil 452. When an electric current flows through the coil 452, a magnetic field is generated in the coil 452, whereby the first arm of the lever 450 is pulled to the coil 452 by means of this magnetic field. A tension spring 451 is arranged opposite the coil 452, whereby this tension spring 451 is designed to exert a force countering the magnetic force on the first arm of the lever 450. In this way, the first arm of the lever 450 is pulled away from the coil 452 when the current through the coil 452 is switched off.

A tension spring 458 is designed to exert a force on the slide valve 311 in the direction of the arrow 367. A projection 440 is arranged on a side of the slide valve 311 that faces the lower housing part 302. A distance between the slide valve 311 and the lever 450 is selected in such a way that the projection 440 bumps into the second arm of the lever 450 when the first arm of the lever 450 is not drawn by the coil 452, while the projection 440 can move beyond the second arm of the lever 450 as long as the coil 452 attracts the first arm of the lever 450. In this way, the slide valve 311 that acts on the throttle valves 305, 306 can move in the direction of the arrow 367 when the current is switched on through the coil 452. Consequently, the throttle valves 305, 306 can be electrically switched between the partially open position and the open position.

A grip 443 is mounted on a side of the slide valve 311 that faces the first housing part 301. A part 459 of the grip 443 projects upwards out of the first housing part 301. As a result, the slide valve 311 can be slid by hand. A switch 457 is designed to output a signal to the switching circuit 455 when the slide valve 311 is moved against the direction of the arrow 367. For example, this can occur when an electric circuit is opened or closed.

The switching circuit 455 is connected to an operating device 409. The operating device 409 can be provided on an upper side of the upper housing part 301 and can have a display and/or one or more buttons. For example, the display can comprise a liquid crystal display. Using the buttons of the operating device 409, it is possible to enter a period of time for which the pre-stimulation should be carried out into the switching circuit 455. Consequently, the operating device 409 comprises an adjustment device for selecting the pre-stimulation time.

The pre-stimulation time is input via the operating device 409 before the attachment of the teat cup cluster. If the operating device 409 has a display, the input time can be displayed here. In this way, incorrect inputs can advantageously be easily detected and corrected.

The slide valve 311 is slid in the direction opposite to the arrow 367 with the help of the grip 443 before the teat cup cluster is attached. In this way, it is ensured that the rods of the plungers of the throttle valves can move essentially freely in the deeper portion of the wedge-shaped recesses 341, 342 and so can carry out their pressure regulation function. The current flow through the coil 452 is switched off at this point in time, so that the slide valve 311 is prevented by the second arm of the lever 450 from moving back in the direction of the arrow 367 and opening the throttle valves 305, 306 completely.

When the slide valve 311 is moved, the switch 457 emits a signal to the switching circuit 455. The switching circuit 455 is designed to measure the time that has elapsed since the receipt of the signal from the switch 457 and, after the expiry of the selected pre-stimulation time, to set up an electrical connection between the coil 452 and the current source 454, so that an electric current flows through the coil 452. When the current is flowing through the coil 452, this coil 452 generates a magnetic field which attracts the first arm of the lever 450. Hence the lever 450 rotates around the axle 453 and the second arm of the lever 450 no longer blocks a movement of the slide valve 311. The slide valve 311 is therefore moved in the direction of the arrow 367 by the force exerted by the tension spring 458, and the throttle valves 305, 306 are opened completely, so that the pressure pulses provided by the pulsator can act on the teat cup liners 105-108 unhindered and milk is removed from the udder of the animal.

Figure 4B:
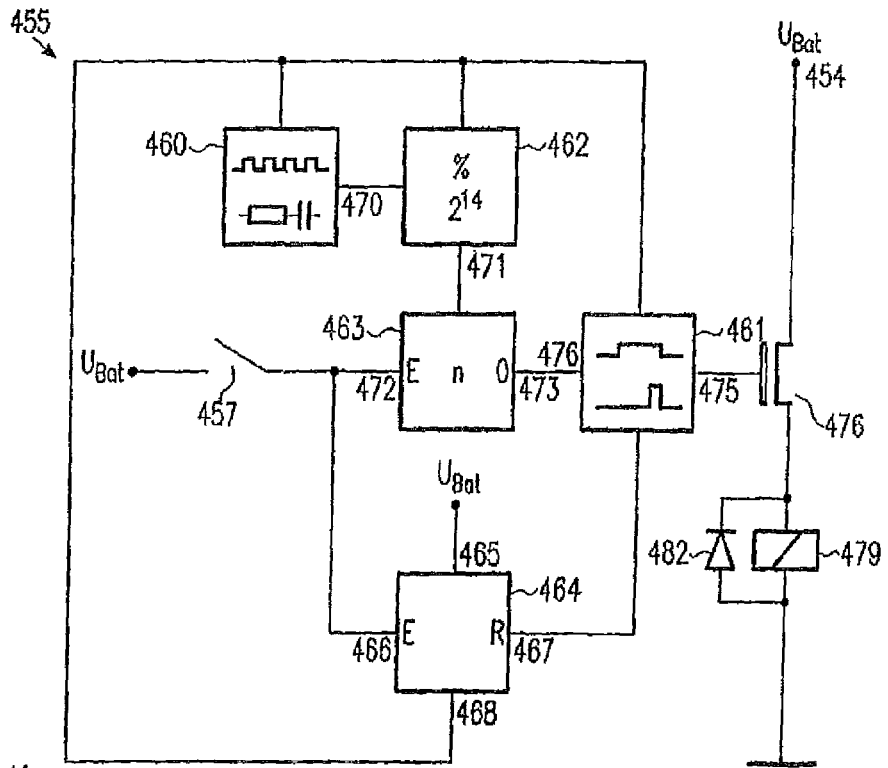

A schematic circuit diagram of the switching circuit 455 in a special embodiment of the present invention is shown in FIG. 4b.

The switching circuit 455 comprises a transistor circuit 464. This has an input 465 and an output 468, as well as a first control terminal 466 and a second control terminal 467. The transistor circuit 464 is designed to produce an electrical contact between the input 465 and the output 468 when it receives a signal at the first control terminal 466. The input 465 and the output 468 are respectively connected to the power source 454 and to power supply terminals of components in the switching circuit 455. The first control terminal is connected to the switch 457, so that after the switch 457 is activated, the components of the switching circuit 455 are provided with current until such a time as the transistor circuit 468 receives a signal at the second control terminal 467. In a special embodiment of the present invention, the transistor circuit 464 can comprise a self-retaining field-effect transistor.

The switching circuit 455 furthermore comprises a first timer 460 and a second timer 461. The first timer 460 is wired in such a way that it outputs a periodic signal, for example a square wave signal, at a second output 470 at a defined frequency. To this end, the switching circuit 455 can comprise additional components not shown in FIG. 4b for the sake of clarity. In a special embodiment of the invention, the signal output by the first timer 460 can have a frequency of approximately 1 kHz. The output 470 of the first timer 460 is connected to a frequency divider 462 that is designed to output at an output 471 a periodic signal at a frequency that is a defined fractional amount of the frequency provided by the first timer 460. In special embodiments of the present invention, the frequency divider 462 can be designed to output a signal at a frequency that is less by a factor of $2^{14}=16,384$.

The output 471 of the frequency divider is connected to an adjustable counter 463. The counter 463 is designed to count, after receipt of a signal at an input 472, a number of pulses provided by the frequency divider 462 and, after receipt of a defined number n of pulses, to output a signal at an output 473. The input 472 is connected to the switch 457, so that the counting process is started when the switch 457 is activated.

The number n for the counter 463 can be selected via the grip 443 at the slide valve 311 and the switch 457 connected to it. The switch 457 can be positioned on the slide valve 311 in such a way that it does not switch until the slide valve 311 is spanned beyond the lock-in point between the second arm of the lever 450 and the projection 440. In this way, it is possible to activate the switch 457 a number of consecutive times when the slide valve is spanned against the spring force of the spring 458. With the first activation of the spanned slide valve 311, n=6, and n is reduced to 4, 3 and 2 with each further activation during the stimulation time. Consequently, the stimulation time can roughly be set to 90, 60, 45 or 30 seconds by a simple, repeated activation of the spanned slide valve 311.

The output 473 of the counter 463 is connected to an input 474 of the second timer 461. The second timer 461 is wired in such a way that after the receipt of a signal at the input 474 during a defined circuit time, a voltage is applied to an output 475. To this end, additional components, not shown in FIG. 5, can be provided in the switching circuit 455. The output 475 is connected to a gate of a field-effect transistor 476.

The field-effect transistor 476 is connected to a terminal 479 of the coil 452 and is designed to produce an electrical connection between the current source 454 and the terminal 479 as long as the voltage provided by the second timer 461 is present at its gate. Parallel to the coil 452, a diode 482 can be connected in order to prevent damage to components of the switching circuit 455 due to inductively generated high voltages that can occur when the coil 452 is switched.

A second output of the second timer 461 is connected to the second control terminal 467 of the transistor circuit 464. In this way, the power supply of the components of the switching circuit 455 is switched off with a time delay after the lever 450 is released.

During operation of the control device 409, the power supply to the components of the switching circuit 455 is switched on via the transistor circuit 464 by means of activation of the switch 457. At the same time, a signal is applied to input 472 of the counter 463, whereupon this counter 463 begins to count the pulses received from the frequency divider 462. After the defined number of pulses has been received, the counter 463 outputs, at its output 473, a signal by means of which the second timer 474 is led to apply a voltage at the gate of the field-effect transistor 476 during the defined circuit time. An electrical connection is produced between the current source 454 and the coil 452 during the defined circuit time via the field-effect transistor 476. In this way, the movement of the slide valve 311 is triggered, by means of which the throttle valves 305, 306 are opened completely and the pre-stimulation is ended.

The first timer 460 outputs signals with a defined frequency. The frequency of the signals is reduced by a defined factor by the frequency divider 471. The counter 463 counts a defined number of signals of the low frequency, before it outputs a signal which causes the complete opening of the throttle valves 305, 306 and therefore the end of the pre-stimulation. Consequently, the throttle valves 305, 306 are opened after a defined length of time that depends on the frequency of the signals output by the first timer 460 and the number of pulses counted by the counter 463 until the signal is output. The duration of the pre-stimulation can be regulated by means of varying the frequency of the pulses output by the first timer 460 and/or the number of pulses regulated by the counter 463 until the output of the signal, by means known to the person skilled in the art.

In further embodiments of the present invention, the control device 409 comprises a pressure sensor instead of the switch 457. This pressure sensor is designed to measure a pressure in at least one of the first connections 350, 351. The switching circuit 455 in such embodiments is designed to detect pressure pulses that are provided by the pulsator, to start the electronic timer when a pressure pulse is detected, to measure, with the help of the electronic timer, the time that has elapsed since the first pressure pulse from the pulsator was detected and, after the expiry of the selected pre-stimulation time, to set up an electrical connection between the coil 452 and the current source 454. In this way, the necessity of defining the start of the pre-stimulation by moving the grip 443 manually is advantageously eliminated.

In some embodiments of the present invention in which the start of the pre-stimulation is determined by detecting a pressure pulse from the pulsator, the grip 443 of the slide valve 311 can be replaced with an electric actuator that is designed to move the slide valve 311 in the direction opposite to the arrow 367. Such an actuator can, for example, comprise a lifting magnet similar to the coil 452 and a component made of ferromagnetic material that is connected to the slide valve 311. Advantageously, it is not necessary in such embodiments to move the slide valve 311 by hand. In this way, the operation of the device 300 is simplified and it is possible to eliminate mistakes that arise because the operator forgets to move the slide valve 311.

It does not have to be possible to move the slide valve 311 in a lengthwise direction, as in the embodiments described above. The slide valve can be supported so that it can be rotated around an axle in other embodiments. In this way, a more precise and simpler support of the second arm of the lever 450 and the projection 440 relative to one another is advantageously facilitated. In this way, the distance that the arms of the lever 450 must cover when the throttle valves 305, 306 are opened completely can be reduced. This can lead to a reduction in the power consumption when the throttle valves 305, 306 are opened.

The device 300 for stimulating an udder during milking does not have to comprise a slide valve 311. In other embodiments of the present invention, the throttle valves 305, 306 can instead be provided in the form of electrically switchable electrovalves that can be controlled directly by the switching circuit 455. In this way, the number of moving mechanical components in the device 300 can be advantageously reduced, as a result of which the reliability of the device 300 can be improved.

The throttle valves do not have to be formed as pressure regulation valves as in the embodiments described above. In other embodiments, it can be possible to switch the throttle valves 305, 306 between a partially open position, in which they oppose a flow of gas with a resistance, and an open position, in which they essentially do not oppose a flow of gas with a resistance.

Figure 6:
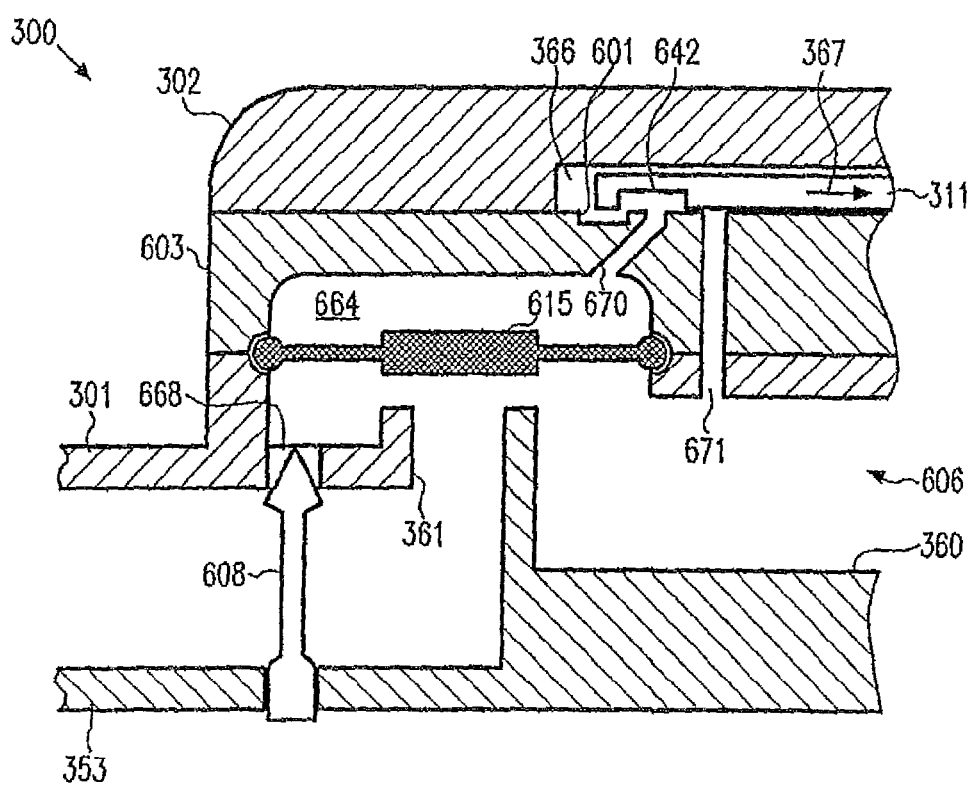
FIG. 6 a schematic cross-sectional view of a throttle valve in a device for stimulating an udder during milking according to an embodiment of the present invention.

A schematic cross-sectional view of a throttle valve 606 in an embodiment of the present invention without pressure regulation valves is shown in FIG. 6.

The throttle valve 606 comprises a membrane 615 that is clamped between the first housing part 301 and a third housing part 603 provided between the first housing part 301 and the second housing part 302. An opening 361, which produces a fluid flow connection between the conduit 360 and the second connection 353, is located below the membrane 615. When no force is applied to the membrane, it is located in an initial position, shown in FIG. 6, in which it leaves the opening 361 open due to its elastic tension.

A first pressure equalization conduit 670 is connected to the chamber 664 above the membrane 615. A second pressure equalization conduit 671 is connected to the conduit 360. A control slide 311 is located over the upper ends of the pressure equalization conduits 670 and 671, whereby these ends lie close to each other. This control slide has a recess 642 on a side facing the third housing part 603.

During the pre-stimulation, the slide valve 311 is located in the position shown in FIG. 6. In this way, air can flow through a recess 601 in the third housing part and the recess 642 of the slide valve 311 between the volume 664 and the chamber 366, so that the pressure in the chamber 664 is essentially equal to the atmospheric pressure. The second pressure equalization conduit 671 is closed by the slide valve 311 in this state.

At the end of the pre-stimulation, the slide valve 311 similar to that in the embodiments described above moves in the direction of the arrow 367, namely so far that the recess 642 is located above the openings of the first pressure equalization conduit 670 and the second pressure equalization conduit 671. Dimensions of the recess 642 and other parts of the slide valve 311 are designed in such a way that the recess 642 produces a fluid flow connection between the first pressure equalization conduit 370 and the second pressure equalization conduit 371 in this position of the slide valve 311 and the slide valve 311 seals the connection between the first pressure equalization conduit 670 and the chamber 366. Consequently, the pressure in the chamber 664 in this state is essentially equal to the pressure in the conduit 360.

During the pre-stimulation, the atmospheric pressure acts on the elastic membrane 615 on the side facing the chamber 664. The vacuum provided by the pulsator acts on the side of the membrane 615 that faces the opening 361. In this way, the membrane is pressed towards the opening 361 from its initial position, until the opening 361 is sealed by the membrane 615. A nozzle 668 is located next to the opening 361, whereby this nozzle 668 produces a fluid flow connection between the conduit 360 and the second connection 353. By turning an adjusting screw 608 similar to the adjusting screw 308 in the embodiment described above with reference to FIG. 3b, it is possible to adjust a flow resistance of the nozzle 668. The nozzle 668 is designed to counteract a flow of the gas through the nozzle 668 with a relatively large resistance, so that the pressure in the connection 353 during the pressure pulses provided by the pulsator slowly drops. In this way, the pressure in the conduit 360 progresses in a manner similar to that depicted in the curve 505 in FIG. 5.

After the end of the pre-stimulation, the pressure on both sides of the membrane 615 is essentially equal, so that essentially no more force acts on the membrane. Therefore the membrane is in its initial position, in which it does not block the opening 361, so that air can flow through the opening 361 and the pressure in the connection 353 is essentially equal to the pressure provided by the pulsator. Consequently, there is a pneumatic inhibition of the effect of the throttle valve 606.

The slide valve 311 does not have to be a lengthwise slide valve. The upper ends of the pressure equalization conduits 670 and 671 can also be activated by a rotary disc valve. In one embodiment of the invention, an appropriately designed front face of the toothed wheel 312 can work as a rotary disc valve.

In another embodiment of the invention, the second pressure equalization conduit 671 is not connected to the chamber 366, but instead directly to the chamber 664. A restrictor element, for example a nozzle, is provided in the pressure equalization conduit 671, whereby this restrictor element counteracts a flow of gas between the chamber 664 and the conduit 360 with a relatively large resistance. The first pressure equalization conduit 670 is arranged as shown in FIG. 6 and does not contain any restrictor element. A switchable closing element that can either close the opening or release it acts on the upper end of the first pressure equalization conduit 670.

When the opening of the first pressure equalization conduit 670 is closed, essentially the same pressure appears in the chamber 664 above the membrane via the second pressure equalization conduit 671 as in the conduit 360 and therefore in the chamber below the membrane 615. In this way, the membrane 615 remains in its initial position as shown in FIG. 6 due to its elastic tension. This position allows an unhindered flow between the conduit 360 and the second connection 353, as is intended for normal milking.

If the upper opening of the first pressure equalization conduit 670 is released, atmospheric air flows through it into the chamber 664 above the membrane 615. Because the flow resistance in the first pressure equalization conduit 670 is considerably less than that in the second pressure equalization conduit 671, which is provided with a restrictor element and which connects the chamber 664 above the membrane 615 to the conduit 360, essentially atmospheric pressure appears in the chamber 664. Consequently, the membrane 615, due to the difference in pressure on its top side and its bottom side, is moved in the direction of the opening 361, so that this opening is closed. As a result, the flow between the conduit 360 and the second connection 353 is restricted, as is intended for the pre-stimulation phase. The embodiment described here has, in particular, the advantage that the switchable closing element can be formed so that it is very small and requires very little switching force. In this way, such a closing element, such as when it is made from a ferromagnetic material, can also be activated directly by the magnetic force of a small coil that consumes little energy. By means of such a simplified configuration, the manufacturing costs can be reduced without it being necessary to accept disadvantages in operation or energy consumption.

The invention claimed is:

1. A device for stimulating an udder during milking comprising:
    a housing that can be grasped by a hand and that has a first connection and a second connection, the first connection connecting the housing to a first line that is at least partially outside the housing, the first line connecting the housing to a pulsator outside the housing, and the second connection connecting the housing to a second line that is at least partially outside the housing, the second line connecting the housing to a first teat cup;
    a first throttle valve interposed in the housing between the first connection and the second connection, wherein the first throttle valve can be electrically switched between a partially open position and an open position; and
    a control device housed in the housing and designed to move the first throttle valve from the partially closed position into the open position after a specified length of time from about 30 seconds to about 90 seconds, wherein the control device comprises an electronic timer and a switching circuit that switches the throttle valve upon receipt of a signal from the electronic timer;
    a slide valve that can be tensed against a spring force and locked into place and that is designed to act on the first throttle valve; and
    an electrically controllable unlocking device that is designed to release the slide valve when a signal is received from the switching circuit.

2. The device for stimulating an udder during milking according to claim 1, said device having a total length of not more than 15 cm.

3. The device for stimulating an udder during milking according to claim 1, said device having a total weight of not more than 150 grams.

4. The device for stimulating an udder during milking according to claim 1, wherein the control device comprises an adjustment device for setting the specified length of time.

5. The device for stimulating an udder during milking according to claim 4, wherein the adjustment device comprises a striking mechanism that is designed to generate at least one of an acoustic signal and a signal that can be felt in the hand should a value that falls below a threshold value be set for the specified length of time.

6. The device for stimulating an udder during milking according to claim 1, wherein the switching circuit comprises a pressure sensor that is in a fluid flow connection with the first connection and wherein this switching circuit is designed to start the electronic timer when a pressure impulse is detected.

7. The device for stimulating an udder during milking according to claim 1, wherein said housing further has a third connection and a fourth connection, the third connection connecting the housing to the pulsator, the fourth connection connecting the housing to a second teat cup, a second throttle valve being interposed in the housing between the third connection and the fourth connection, the control device being adapted to move both the first and the second throttle valve from the partially closed position into the open position after the specified length of time.

8. The device for stimulating an udder during milking according to claim 1, wherein the throttle valve comprises a pressure regulation valve.

9. The device for stimulating an udder during milking according to claim 8, wherein the pressure regulation valve comprises an adjustable elastic element.

\* \* \* \* \*